United States Patent
Aderhold et al.

(10) Patent No.: US 8,109,669 B2
(45) Date of Patent: Feb. 7, 2012

(54) TEMPERATURE UNIFORMITY MEASUREMENT DURING THERMAL PROCESSING

(75) Inventors: Wolfgang Aderhold, Cupertino, CA (US); Jallepally Ravi, Santa Clara, CA (US); Balasubramanian Ramachandran, Santa Clara, CA (US); Aaron M. Hunter, Santa Cruz, CA (US); Ilias Iliopoulos, Foster City, CA (US)

(73) Assignee: Applied Materials, Inc., Santa Clara, CA (US)

( * ) Notice: Subject to any disclaimer, the term of this patent is extended or adjusted under 35 U.S.C. 154(b) by 682 days.

(21) Appl. No.: 12/273,842

(22) Filed: Nov. 19, 2008

(65) Prior Publication Data
US 2010/0124249 A1      May 20, 2010

(51) Int. Cl.
H01L 21/66       (2006.01)
H01L 21/324      (2006.01)

(52) U.S. Cl. ............ 374/124; 374/1; 374/137; 702/130; 219/494

(58) Field of Classification Search .............. 374/124, 374/1, 137; 702/130; 219/494
See application file for complete search history.

(56) References Cited

U.S. PATENT DOCUMENTS

| | | | | |
|---|---|---|---|---|
| 5,350,899 A | * | 9/1994 | Ishikawa et al. | 219/494 |
| 5,743,643 A | * | 4/1998 | Gronet et al. | 374/121 |
| 5,775,808 A | * | 7/1998 | Pan | 374/161 |
| 5,848,842 A | * | 12/1998 | Peuse et al. | 374/1 |
| 5,985,678 A | * | 11/1999 | Kiyama | 438/5 |
| 6,157,106 A | | 12/2000 | Tietz et al. | |
| 6,164,816 A | | 12/2000 | Aderhold et al. | |
| 6,492,625 B1 | | 12/2002 | Boguslaviskiy et al. | |
| 6,855,916 B1 | | 2/2005 | Matthews et al. | |
| 7,629,184 B2 | * | 12/2009 | Kulp | 438/14 |
| 2006/0173646 A1 | * | 8/2006 | Tanaka et al. | 702/130 |
| 2007/0238202 A1 | * | 10/2007 | Ranish et al. | 438/14 |
| 2008/0025368 A1 | | 1/2008 | Aderhold et al. | |
| 2008/0156785 A1 | | 7/2008 | Ookura et al. | |
| 2010/0133257 A1 | * | 6/2010 | Sorabji et al. | 219/447.1 |
| 2011/0143016 A1 | * | 6/2011 | Hong et al. | 427/8 |

FOREIGN PATENT DOCUMENTS

JP       2007-123643       5/2007

OTHER PUBLICATIONS

Use of Virtual Metrology and APC for RTP Critical Anneals, I. Iliopoulos, et al., 7$^{th}$ AECA/APC-Europe, Dresden 2007, 16 pp.
International Search Report and Written Opinion for PCT/US2009/064956, dated Jun. 14, 2010, 10 pgs.

* cited by examiner

*Primary Examiner* — Christopher Fulton
(74) *Attorney, Agent, or Firm* — Diehl Servilla LLC

(57) ABSTRACT

Methods and systems for determining a radial differential metrology profile of a substrate heated in a process chamber is provided. Methods and systems for determining an angular or azimuthal differential metrology profile of a rotating substrate in a processing chamber are also provided. The radial and azimuthal differential metrology profiles are applied to adjust a reference metrology profile to provide a Virtual metrology of the process chamber. The virtual metrology is applied to control the performance of the process chamber.

20 Claims, 12 Drawing Sheets

TEMPERATURE UNIFORMITY MEASUREMENT DURING THERMAL PROCESSING

BACKGROUND

Embodiments of the present invention generally relate to semiconductor device manufacturing. Specific embodiments pertain to temperature distribution measurements during thermal processing as an indication of process uniformity.

Typically, process quality assessment on a rapid thermal processing (RTP) tool consists to a large part in processing expensive, high quality monitor wafers that need to be analyzed using metrology tools like 4-point probes for sheet resistance, or ellipsometers for film thickness. By running the production recipe, the sheet resistance variation across the monitor wafer can be measured and it can be assumed that this is representative for the uniformity of any product wafer. By optimizing the process parameters, the resistivity variation of the monitor wafer is minimized, which would result in the best possible uniformity also on all product wafers. To ensure production yield, sample monitoring may be performed each shift or each day.

However, the use of monitor wafers has the tendency of being either expensive or inaccurate and it assumes and relies on a perfectly stable processing situation. With more aggressive thermal processing requirements, i.e. faster ramp rates, minimal time at temperature, and higher demands for uniformity and repeatability new approaches are needed. In RTP, the variability of the thermal properties of wafers challenges the controlled performance of the system. There is an increased need to address the smaller scale variability within the wafer during thermal processing. In addition, RTP may involve application of a heating spike over a finite duration on a rotating substrate. Direct temperature measurements reflect changing temperature as a result of a spike and/or of a directional (rotational) effect, and therefore may not immediately reveal if a process is stable or uniform without applying a metrology on a wafer, which may be a monitor wafer.

Therefore, there is a need to provide novel and improved methods and systems for temperature measurement that can determine uniformity of an RTP process based on in-process measurements of temperature and other directly measurable in process phenomena without the exclusive use of monitor substrates.

SUMMARY OF THE INVENTION

Aspects of the invention pertain to method and systems for determining a virtual metrology profile of a substrate being processed in a process chamber.

In one embodiment a method of determining a virtual metrology profile of a substrate being processed in a process chamber is provided in which the process chamber has a plurality of heat sources being controlled by a plurality of control signals being generated by a control system, and the processing chamber has a plurality of pyrometers. One embodiment of the method comprises processing a reference substrate and determining a reference metrology profile; determining a first differential profile of the substrate based on a first set of the plurality of control signals and based on a second set of the plurality of control signals; determining a second differential profile of the substrate by processing a first and a second plurality of signals generated by the plurality of pyrometers; and determining the virtual metrology profile by adjusting the reference metrology profile in accordance with the first and the second differential profile.

One or more method embodiments further comprise rotating the substrate while the substrate is heated. In one embodiment, the first differential profile represents a radial temperature differential of the substrate. In at least one embodiment, the control signal is a lamp control voltage.

In one or more embodiments, the second differential profile represents an azimuthal temperature differential of the substrate. According to at least one embodiment, the virtual metrology profile relates to a thickness of a layer. In another embodiment, the virtual metrology profile relates to a sheet resistance. In one or more embodiments, the virtual metrology profile relates to a transistor property.

According to one or more embodiments, a method further comprises determining if the virtual metrology profile is substantially different from the reference metrology profile. The method may further include modifying an operational parameter setting of the process chamber and/or interrupting operation of the process chamber. In one or more embodiments, the reference substrate is a monitor wafer.

Another aspect of the invention pertains to a system for creating a virtual metrology profile for a process chamber, the process chamber having a plurality of heat sources being controlled by a plurality of control signals being generated by a control system, and the processing chamber having a plurality of temperature sensors. In one embodiment, the system comprises a computer memory; and a processor enabled to read instructions and data from the computer memory, to write data to the computer memory and enabled to execute the instructions to perform the steps of: processing a reference substrate and determining a reference metrology profile; determining a first differential profile of the substrate based on a first set of the plurality of control signals and based on a second set of the plurality of control signals; determining a second differential profile of the substrate by processing a first and a second plurality of signals generated by the plurality of pyrometers; and determining the virtual metrology profile by adjusting the reference metrology profile in accordance with the first and the second differential profile.

In one embodiment of the system, the first differential profile represents a radial temperature differential of the substrate. In one system embodiment, the control signal is a lamp control voltage. In one or more system embodiments, the second differential profile represents an azimuthal temperature differential of the substrate. The virtual metrology profile can relate to a thickness of a layer and/or a transistor property.

Another aspect of the invention pertains to a method for generating a virtual metrology (VM) profile determined from a substrate temperature, the method comprising determining a differential azimuthal temperature distribution of the substrate relative to a reference run; determining a differential radial temperature distribution of the substrate relative to the reference run; and determining a VM result by processing a measured temperature distribution from the reference run, the differential radial temperature distribution, and the differential azimuthal temperature distribution. One or more system embodiments may further include determining if the virtual metrology profile is substantially different from the reference metrology profile.

The foregoing has outlined rather broadly certain features and technical advantages of the present invention. It should be appreciated by those skilled in the art that the specific embodiments disclosed may be readily utilized as a basis for modifying or designing other structures or processes within the scope present invention. It should also be realized by those skilled in the art that such equivalent constructions do not depart from the spirit and scope of the invention as set forth in the appended claims.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Embodiments of the invention generally provide methods and systems for determining uniformity of a process performed in a thermal processing chamber such as an RTP chamber. For example, variation in film thickness and sheet resistance may be related to temperature variation across a substrate. Other properties of a wafer or properties of a device on a wafer may also depend on temperature or temperature variation. These properties may relate to transistor parameters or frequency of a ring oscillator or any other property that is temperature dependent. These properties are important indicators to determine the quality of the devices or wafers produced by the RTP process. It is desirable to maintain these properties as constant as possible.

In accordance with one or more embodiments, certain measurable process parameters, such as temperature and certain process signals or process control signals such as heating lamp voltages can be measured and processed to provide a good indication of process uniformity, almost or close to real-time. In one or more embodiments, virtual sensors and/or measurements are utilized to determine uniformity. Such virtual measurements will be referred to herein as "virtual metrology". In one embodiment, a transformation of time series chamber data from pyrometers and other control signals into thermal wafer images at any time window during the process is used to determine uniformity. Temperature maps can be generated that can be correlated with metrology data from RTP processes.

Embodiments of the present invention allow monitoring of uniformity of a substrate processed in an RTP chamber based on data provided by the RTP chamber (e.g., without requiring the substrate to be analyzed in a stand alone or other metrology tool such as an ellipsometer or sheet resistance measurement tool). For example, temperature data generated by an RTP chamber while a substrate is processed may be employed to generate a temperature map, such as a contour map, of the substrate during processing. Such temperature data also may be used to identify process uniformity issues, tool problems and/or faults, and the like.

In some embodiments, temperature data analysis may be performed in real time and/or while a substrate is being processed. Temperature data also may be analyzed after processing of a substrate is complete.

Because existing temperature data from an RTP chamber is employed, implementation of the present invention is inexpensive and the use of monitor substrates can be largely eliminated. For example, temperature data from "dummy" substrates or production substrates may be used to determine process uniformity.

The methods of virtual metrology (VM) as disclosed herein are provided in the context of RTP processing chambers. VM may also be applied in other types of thermal processing chambers. An overview of the working of an RTP processing chamber is provided below.

Figure 1:
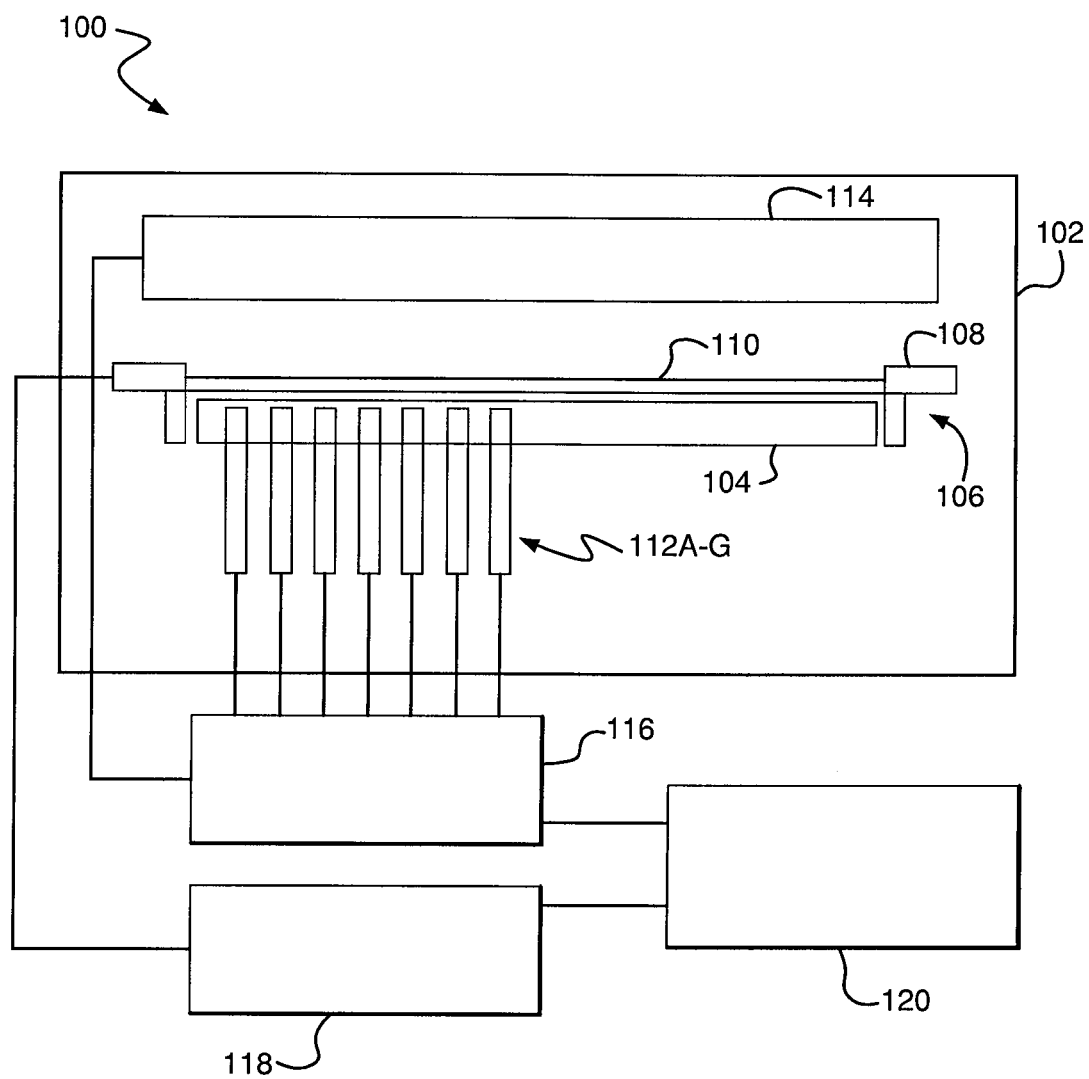
FIGS. 1 and 2 are schematic diagrams of a processing chamber in accordance with an embodiment of the present invention.

FIG. 1 is a simplified schematic view of an exemplary rapid thermal processing (RTP) tool 100 provided in accordance with an embodiment of the present invention. The RTP chamber 100 may be based on, for example, a 300 mm Vantage chamber available from Applied Materials, Inc. of Santa Clara, Calif., or any other suitable RTP system.

With reference to FIG. 1, the RTP chamber 100 includes a processing chamber 102 that includes a central assembly 104 and a magnetic levitation (maglev) rotation assembly 106 positioned near an outer edge of the central assembly 104. The maglev rotation assembly 106 includes an edge ring 108 adapted to contact a substrate 110 and support and rotate the substrate 110 above the central assembly 104. Although not pictured, other assemblies adapted to rotate the substrate 110 may be used.

The central assembly 104 includes a plurality of temperature measurement probes, such as pyrometers 112A-G, radially spaced along the central assembly 104 and positioned to measure the temperature of the substrate 110 at various radial distances along the substrate 110. In some embodiments, a heat reflector, not shown, may be positioned along a top surface of the central assembly 104 for reflecting heat emitted from the substrate 110 back toward the substrate 110, and the central assembly 104 may be cooled (e.g., so as to cool the reflector).

A lamp head 114 may be positioned above the substrate 110 and central assembly 104 for heating the substrate 110 during rapid thermal processing within the RTP chamber 102. A temperature controller 116 may be coupled to and receive temperature information from the pyrometers 112A-G and use the temperature information to adjust the lamp head 114 (and thus regulate temperature across the substrate 110).

A maglev controller 118 may be provided for controlling operation of the maglev rotation assembly 106. For example, the maglev controller 118 may control the distance that the substrate 110 is raised above the central assembly 104, the rate at which the substrate 110 is rotated and/or the like. Additional exemplary embodiments of a chamber 102 including a central assembly 104 and a maglev rotation assembly 106 are described in U.S. Pat. No. 6,157,106 which is hereby incorporated by reference herein in its entirety.

As shown in FIG. 1, the RTP chamber 100 includes a temperature measurement controller 120 that receives information from both the temperature controller 116 and the maglev controller 118. Based on information from the temperature controller 116 and the maglev controller 118, the temperature measurement controller 120 may determine a temperature profile such as a temperature contour map for the substrate 110 as described further below. The temperature controller 116, the maglev controller 118 and/or the temperature measurement controller 120 may be embodied in a single controller or as multiple controllers. Each controller may include one or more appropriately programmed microprocessors or microcontrollers, memory devices, dedicated hardware, and/or a combination of the same.

In operation, the substrate 110 is loaded into the processing chamber 102 and onto the edge ring 108 of the maglev rotation assembly 106. The edge ring 108 holds the substrate 110 above the central assembly 104 and rotates the substrate 110 (e.g., via a magnetically levitated and rotated cylinder/rotor (not shown)) under control of the maglev controller 118. In at least one embodiment, the substrate 110 is rotated at about 4 hertz or 240 RPM (e.g., 4 revolutions per second) through about 32 evenly distributed rotor positions, although other rotation rates and/or numbers of rotor positions may be used. Hall or similar sensors (not shown) may be used to monitor rotation/position, and substrate position may be measured by the maglev controller 118 (e.g., Theta(t) where theta is angular position of the substrate relative to a reference point such as a notch and t is time).

The temperature controller 116 directs the lamp head 114 to heat the substrate 110 to a desired temperature, and monitors the substrate temperature using, for example, pyrometers 112A-G. In one or more embodiments, the pyrometers 112A-G may be sampled at a rate of about 100 hertz, although other sampling rates may be used. Temperature versus time for each pyrometer 112A-G thereby is measured (e.g., $T_n(t)$ where n represents a given pyrometer). Based on the information from pyrometers 112A-G, the temperature controller 116 may adjust the lamp head 114 to improve temperature uniformity across the substrate 110.

After processing, the temperature controller 116 turns off the lamp head 114 and the maglev controller 118 stops rotation of the substrate 110. The substrate 110 may then be unloaded from the processing chamber 102 for further processing.

Substrate temperature information from the temperature controller 116 and substrate angular position information from the maglev controller 118 are also fed to the temperature measurement controller 120 (during and/or after processing). For example, Theta(t) from the maglev controller 118 and T n(t) from the temperature controller 116 may be fed to the temperature measurement controller 120.

With knowledge of angular substrate position versus time (Theta(t)) and temperature information for each pyrometer ($T_n(t)$), a temperature map of the substrate may be determined for any time window during rapid thermal processing. Exemplary embodiments for determining a temperature map for a substrate are described in U.S. Patent Publication No. US2008/0025368 A1, dated Jan. 31, 2008, which is incorporated herein by reference in its entirety.

In at least one embodiment, a coordinate location on a substrate may be determined for each temperature measurement made. For example, the temperature controller 116 may provide temperature data at a rate of about 100 Hz from the probes (e.g., pyrometers 112A-G), which represents circumferential temperature information. The combination of all 7 probes provides time-based substrate mapping. Coupling the rotational position of the substrate 110 with the known x/y location of a probe provides an unambiguous location for a given temperature datum from the probe on the substrate. Measured and estimated temperature of a substrate over time windows obtained during performance of a recipe may be provided. For example, calculated values may be represented as a contour map over the substrate 110. The contour map may show information including: (1) temperature uniformity; (2) peak temperature; (3) time above temperature; and/or (4) temperature gradient (rotational uniformity).

In one or more embodiments, the temperature measurement controller 120 may execute software which may expand the temperature data from the temperature controller 116 and rotor (rotational) data from the maglev controller 118 into substrate (e.g., wafer) contour data. For example, input data may be provided by the temperature controller 116 with one or more timestamp arrays indicating times at which temperatures were measured at the probes. In some embodiments, the data is provided at a frequency of about 100 Hz, although other rates may be used.

The maglev rotation speed may vary from about 0.1 Hz to about 10 Hz, for example. In at least one embodiment, a rotation speed of about 240 RPM (4 Hz) is used. However, a deviation from that value is possible during ramping, or due to variations of the rotation control. Also, flexibility of the rotation speed may be provided for troubleshooting (e.g., lower speed than 4 Hz) and for process improvements (e.g., higher speed than 4 Hz). The angular precision of the coordinate points on the substrate preferably is better than 1.5 degrees, although other angular precision values may be used.

The probes/sensors, e.g., pyrometers 112A-G, measure each distinct point on the substrate only at the rotation rate, but the variation within a given radial distance is a slowly moving function in time and as such prior information will allow reasonable estimation of temperature at a later point in time. In general, the underlying temperature profile may be similar among all the radial positions and a slow moving function relative to the sampling rate. In the calculation of peak temperature, in some embodiments, the maximum for any given x/y location may not be used. For example, a smoothing function that estimates the peak temperature as well as slope changes may be employed.

As disclosed in U.S. Pat. No. 6,164,816, the entire content of which is incorporated herein by reference, the heating lamps may be arranged in a circular fashion and may also be arranged in lamp groups which may be arranged in zones, wherein each lamp zone has its own lamp control voltage. A temperature on a substrate as a consequence of being heated by the lamps depends on the heating effects creating from the lamps in the different lamp zones. A temperature controller, for instance being a multi-input, multi-output controller, calculates the control voltage for each lamp zone to provide an optimal process. In general, in RTP heating of a substrate occurs by providing a heating spike by the lamps. The heating spike has a ramp-up, a peak and a ramp-down and has a limited duration. In one embodiment a heating spike may take about 5 seconds from ramp-up to ramp-down of control voltages for the heating lamps. Heating spikes may be shorter; they may also last longer.

One procedure to assess a performance of an RTP process is as follows. Process parameters of an RTP chamber may be tuned to an optimal RTP chamber performance. At the optimal stage, a monitor wafer can be run, which then forms the reference of an optimal process setting for this chamber. The monitor wafer can be run after using the chamber in production and compare the recently run monitor wafer with the previously run monitor wafer. Differences between the two monitor wafers may determine if the process is still optimal or acceptable. As was stated above, it may be expensive and/or not practical to run a monitor wafer.

To create a production reference point a prototype or first production wafer can be run almost directly after running the monitor wafer at assumingly optimal process conditions, or at least at known process parameter settings. At that stage, no or almost no changes have taken place in the process or in the sensors. Because a production wafer has a different structure, for instance, in device patterns from the monitor wafer, the temperature controller may adjust the lamp voltages to replicate the optimal settings related to the monitor wafer process. Because the voltage settings at that stage are caused by an optimal process setting, the lamp control voltages may be used as a reference setting.

A matrix G can be used to describe the mathematical relationship between a desired change in power supplied to the lamps in a particular zone and a corresponding change in temperature. More precisely, the matrix G describes the relationship between a change in lamp voltage and the corresponding change in temperature. The following definitions are used: $dV_n$ is the voltage change in lamp zone n, and $dT_n$ is the change in temperature at the radial location of the temperature probe n, where n is an index for the sensors. A change in temperature at a location may depend on voltage changes in different lamp zones. The specific details of the matrix G will vary from one system to another and can be derived experimentally. The formula that describes the relations between $dT_n$ and $dV_n$ is: $dV_n \times G = dT_n$.

A matrix $G_k$ may be determined for different conditions k. A matrix $G_k$ may for instance be represented by one or by a series of look-up tables.

It should be clear that by running a series of monitor wafers under different voltage conditions and performing a metrology, it is possible to derive a matrix H or one or more look-up tables that transforms a temperature or change of temperature into a metrology change in a monitor wafer. Such a change may be a change in thickness of a layer, a change in resistance or any other physical change in a wafer that can be measured as result of a change of temperature. A matrix or one or more look-up tables can be created that relates a change in temperature directly to a change in metrology. If required, such a matrix can be implemented as one or as a set of look-up tables that provides a relationship between metrology and temperature. Accordingly, changes in temperatures can be applied as a virtual metrology indicator for true metrology.

There are at least two temperature effects that have to be determined. The first effect is due to changes in process settings. For instance, sensors may become contaminated and may be one cause of the temperature controller generating lamp voltages with changed values. The changed values of lamp control voltages may create a heating spike from the lamps that cause a different heating pattern and thus a different temperature distribution of the substrate. This effect will be called a radial differential temperature. It is assumed that this effect will affect each point on the same radial distance from the center of a rotating substrate equally, if the substrate is correctly centered. A reference temperature distribution of a substrate may be applied and adjusted for a radial differential temperature. A temperature distribution may then be translated into a distribution of a related parameter by way of a look-up table or a matrix transformation.

A second effect is reflected in temperature differentials during the processing and while the substrate rotates. The temperature effects may appear as depending on the rotation of the wafer with respect to a starting position. This effect may be called an angular or azimuthal differential temperature.

The final temperature distribution may be found by (1) determining a radial temperature differential distribution or profile over a substrate (2) determining an azimuthal temperature differential distribution or profile over a substrate and (3) adding the radial and azimuthal differential temperature profiles to a reference temperature distribution of a first production or prototype wafer. The earlier disclosed matrix H may be applied to translate the temperature distribution into a metrology map or distribution. In general, changes are of interest, rather than absolute values. In that case, the H matrix may be applied to the combination of radial and azimuthal temperature differentials to obtain an indication of overall changes in metrology.

Figure 2:
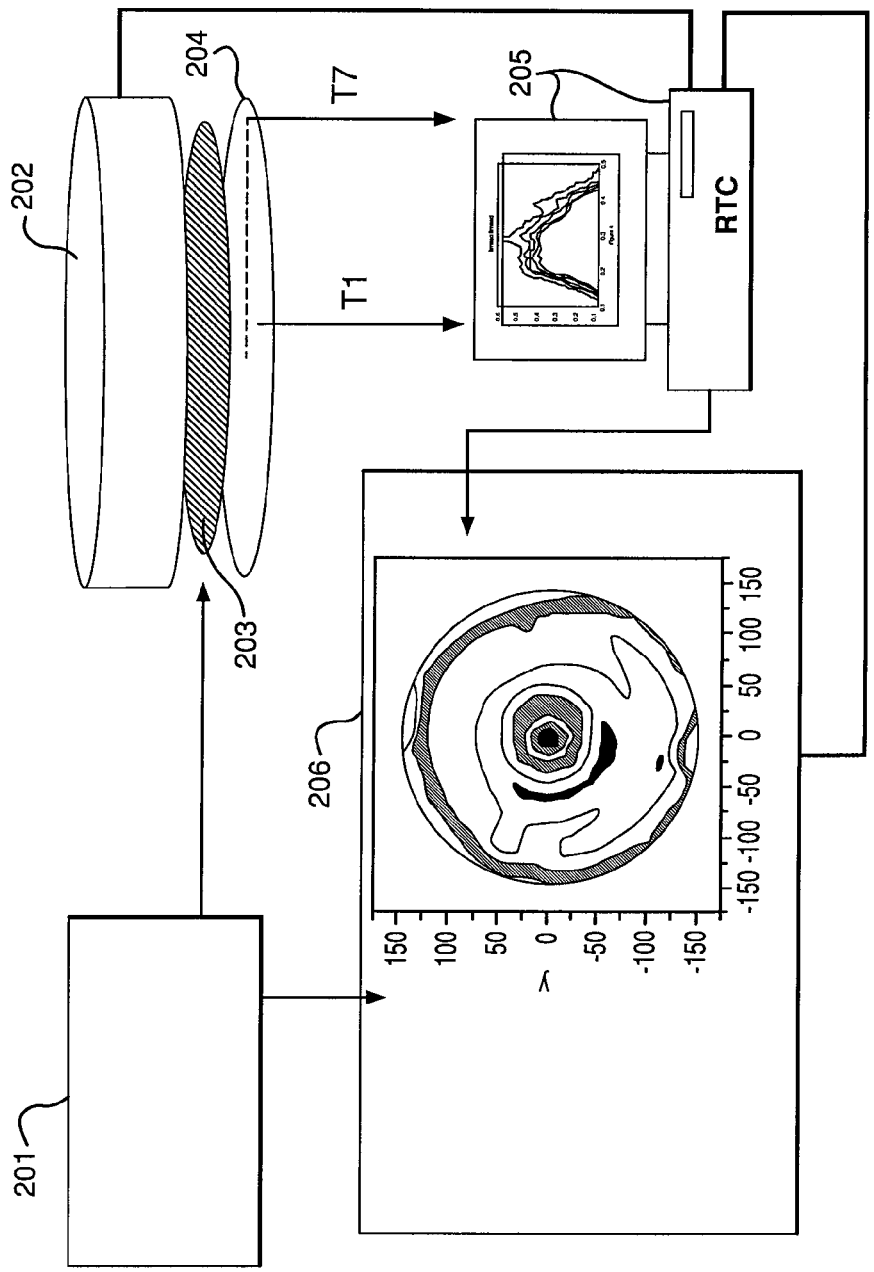

FIG. 2 shows schematically how to determine the radial and the azimuthal temperature differentials. A lamphead 202 heats a substrate 203 which is rotated for instance at 4 Hz by a magnetic levitation device controlled by a controller 201. Voltages to control the lamps in the lamphead are provided by a temperature controller 205. Expected temperatures are predicted, calculated and approximated by the controller 205. The controller applies feedback from temperature measurements by pyrometers 204. When radial and azimuthal differentials or profiles are calculated, a temperature contour map 206 can be established.

The temperature contour map may be applied to check if the current temperature contour differs significantly from a reference contour map. If the difference is significant, for instance exceeding a pre-set limit, an alert may be provided. A processing parameter setting may also be adjusted based on a magnitude or a gradient of a temperature differential. For instance, by running the process under different controlled conditions and at different settings, the effect of settings on substrate properties such as layer thickness, layer resistance, or transistor properties or on any other substrate property that is deemed to be of significance can be checked. Processing parameters are correlated substrate properties and these correlations can be provided in look-up tables. In one embodiment, differences in temperature contours of substrates are correlated with properties of processed substrates. As a result processing parameters of a processing chamber based on calculated differentials are adjusted, and desired properties of processed wafers or substrates can be maintained within a range of preferred values. In a further embodiment, based on measured and/or calculated differentials it may be determined that the processing chamber requires adjustment. In such embodiments, the production of substrates in the chamber can be interrupted to make one or more adjustments to the process. This may prevent a chamber from producing a significant number of substrates with undesirable properties because of inappropriate chamber conditions.

Figure 3:
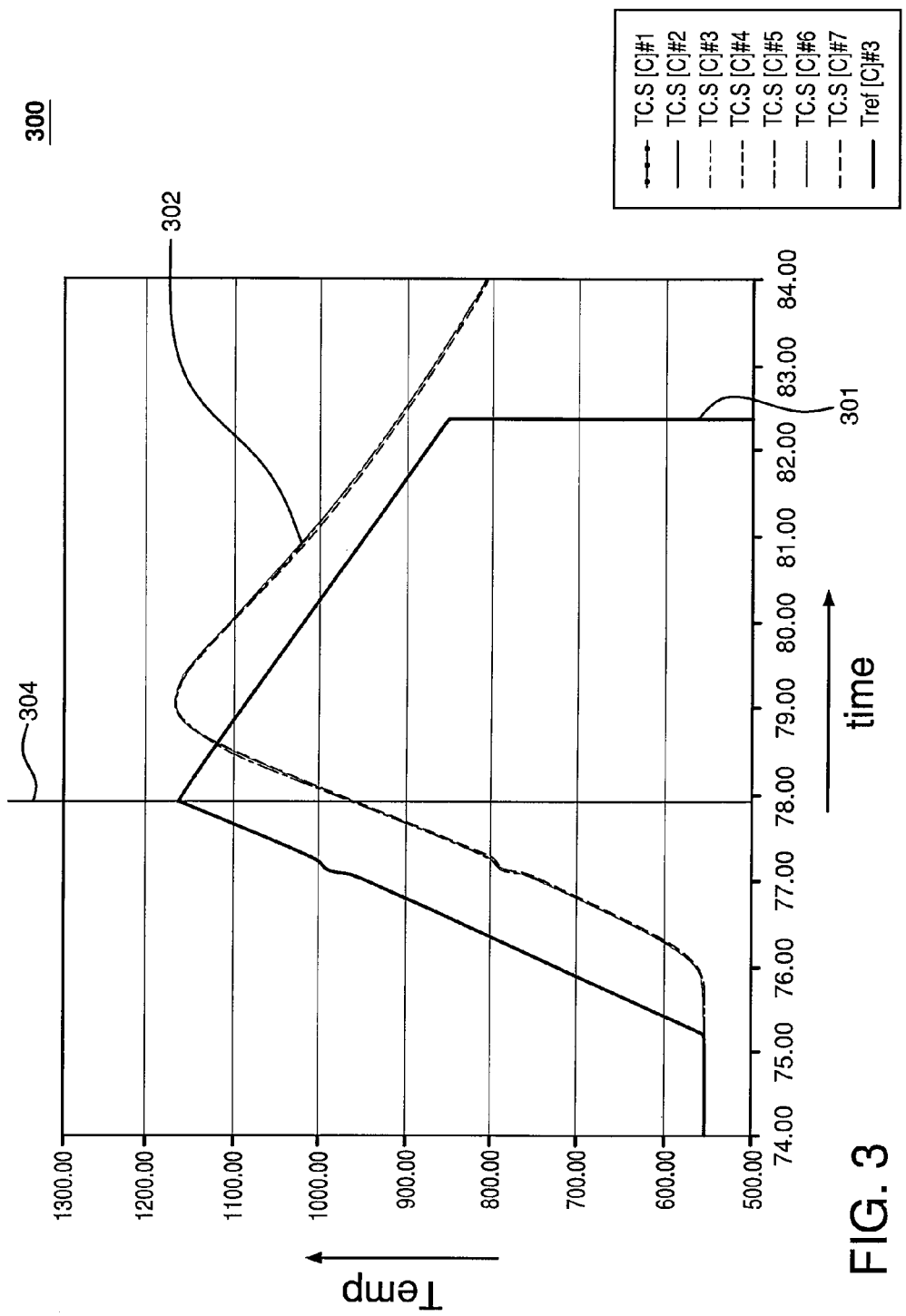
FIGS. 3 and 4 are graphs showing temperature in a processing chamber versus time a in accordance with an embodiment of the present invention.
Figure 4:
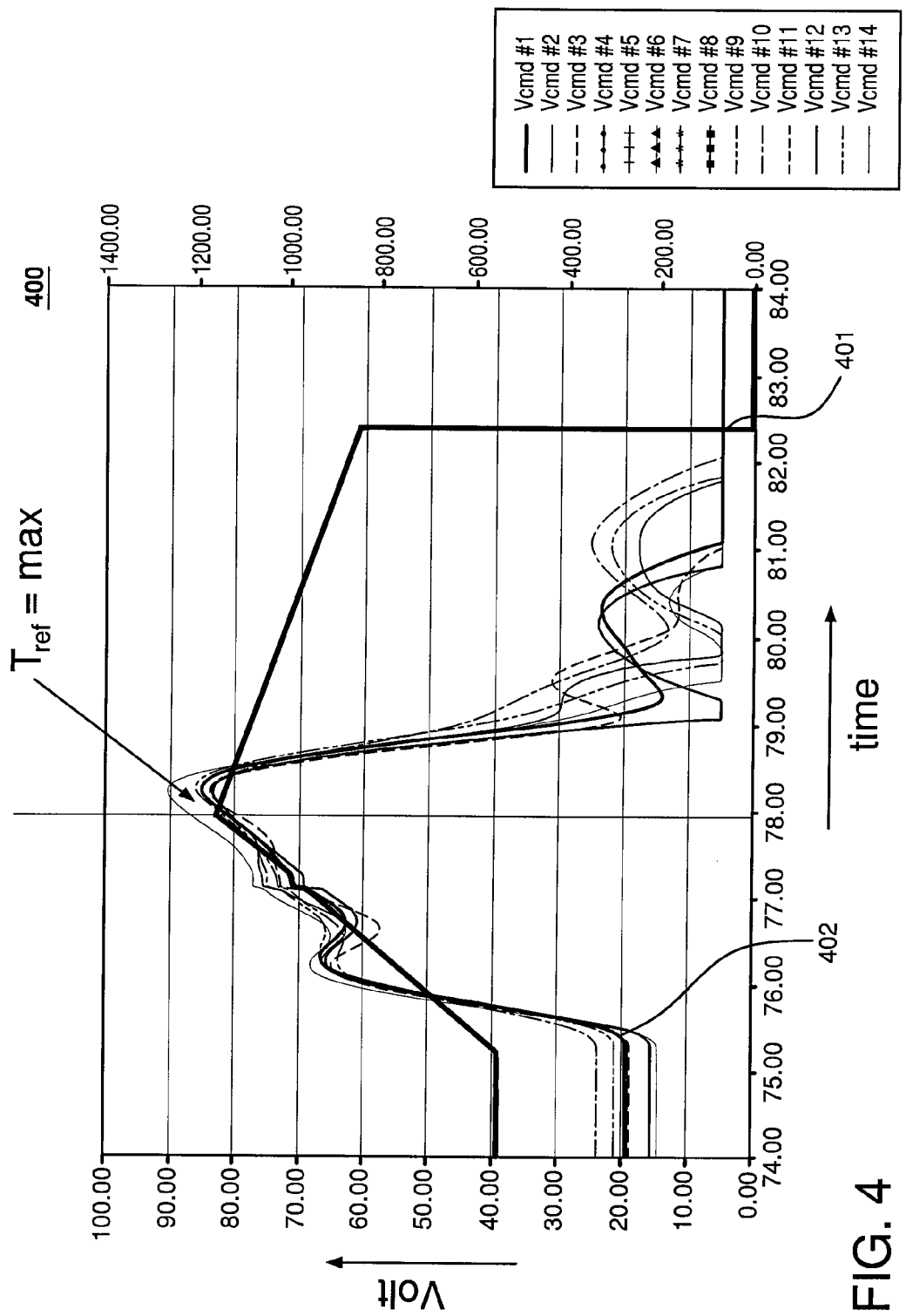

FIGS. 3 and 4 show a temperature and a voltage graph as a function of time for a particular process in a process chamber with lamps in different lamp zones controlled by different voltages and temperatures measured by different pyrometers. FIG. 3 in graph 300 shows the temperature curves over time for the different pyrometers. Curve 301 provides a reference curve corresponding to a preferred temperature profile $T_{ref}$ to be followed as closely as possible by the temperature controller. Vertical line 304 determines the time for which the $T_{ref}$ in preferred profile curve 301 in graph 300 and preferred profile curve 401 in graph 400 has a maximum. Graph 302 shows the overlapping temperature curves related to the seven pyrometers. FIG. 4 shows a graph 400 with the individual voltage curves 402 for each lamp zone over time. The curve 401 is the reference profile curve $T_{ref}$. It shows as explained above the time when the $T_{ref}$ has a maximum. The different voltages for the different lamp zones can be seen in this figure. The radial temperature differential in a preferred embodiment will be calculated with respect to the time when the $T_{ref}$ has its maximum. In a further embodiment, the radial temperature differential can be calculated at other moments or over a period that can be determined unambiguously.

Figure 5:
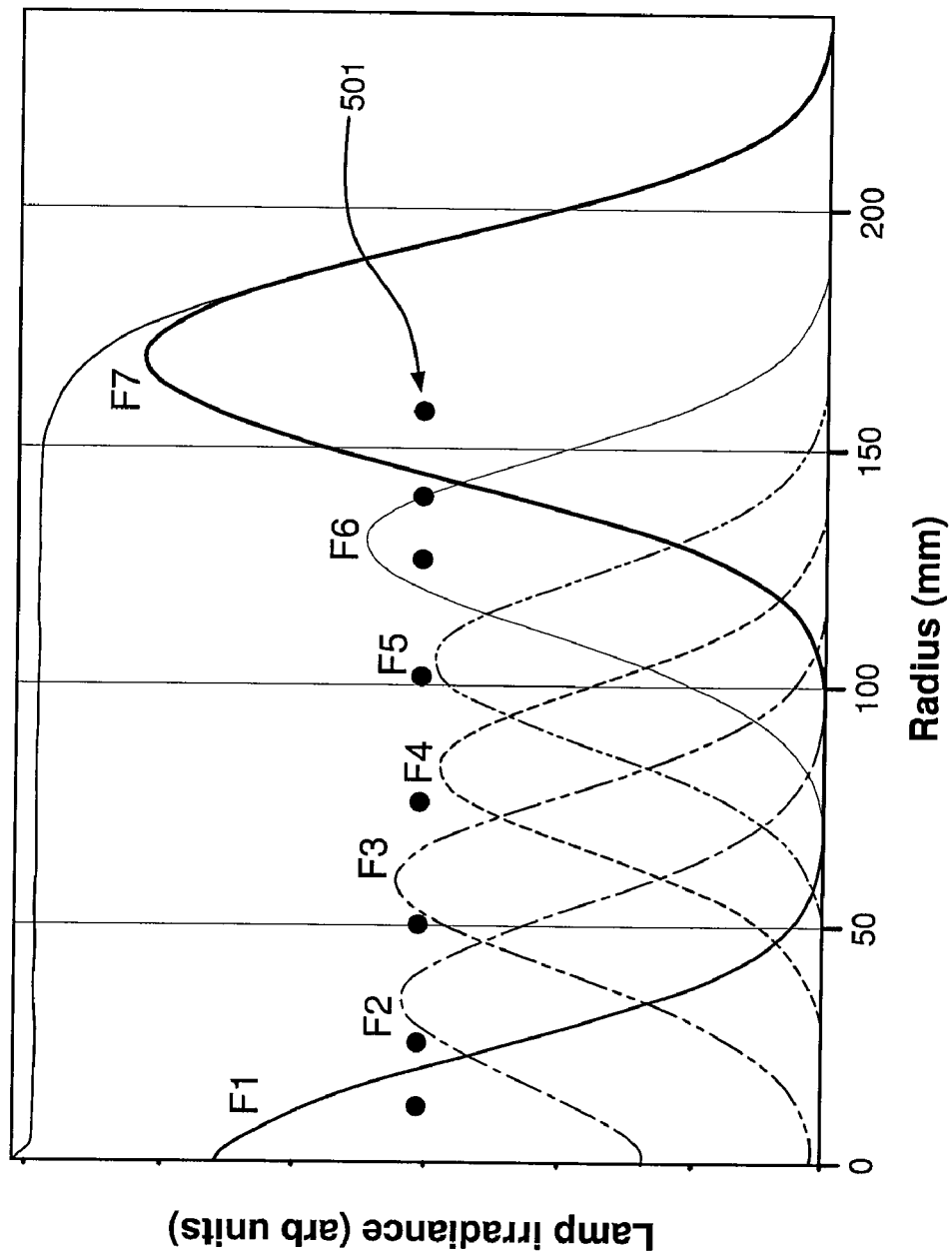
FIG. 5 is a graph showing irradiation as a function of location on a substrate in accordance with an embodiment of the invention.

In order to determine the radial temperature distribution the effects of the changes of voltages of the individual lamp zones, including lamp zones F1, F2, F3, F4, F5, F6 and F7 on a specific location is determined. The curves illustrating the location effects are shown in FIG. 5. Clearly, there is a radial effect. A location of a wafer is effected most if it is directly under a lamp zone. A location on a substrate is considerably affected by lamp zones that are close by. A location is least affected by lamp zones that are further removed from a location. The temperature effects have a bell shaped curve for each of the 7 lamp zones. The dots, of which a dot 501 is specifically identified in FIG. 5, mark the position of a pyrometer. An irradiation contribution from a lamp zone to a radial location of a substrate, can be calculated from all individual contributions from each of the 7 lamp zones. The formula that expresses the total irradiation change as a function of the radius r is: $dI(r)/dV = dF(r)/dV1 + dF(r)/dV2 + \ldots + dF(r)/dV7$.

To obtain the irradiance change for a given voltage differential one needs to calculate $dI(r) = dI(r)/dV * deltaV$. The following illustrative example is provided. The following table shows the command voltages for the different lamp zones. The column under Reference provides the voltages of a reference or prototype run. The column under Production provides the voltages of a production run. The column under deltaV shows the different voltage differentials. All voltages are measured at t for $T_{ref}$ is maximal.

|    | Reference | Production | delta V = $V_P - V_R$ |
|----|-----------|------------|------------------------|
| V1 | 78        | 77         | −1                     |
| V2 | 79        | 80         | 1                      |
| V3 | 77        | 77         | 0                      |
| V4 | 78        | 77         | −1                     |
| V5 | 78        | 78         | 0                      |
| V6 | 79        | 79         | 0                      |
| V7 | 84        | 86         | 2                      |

Figure 6A:
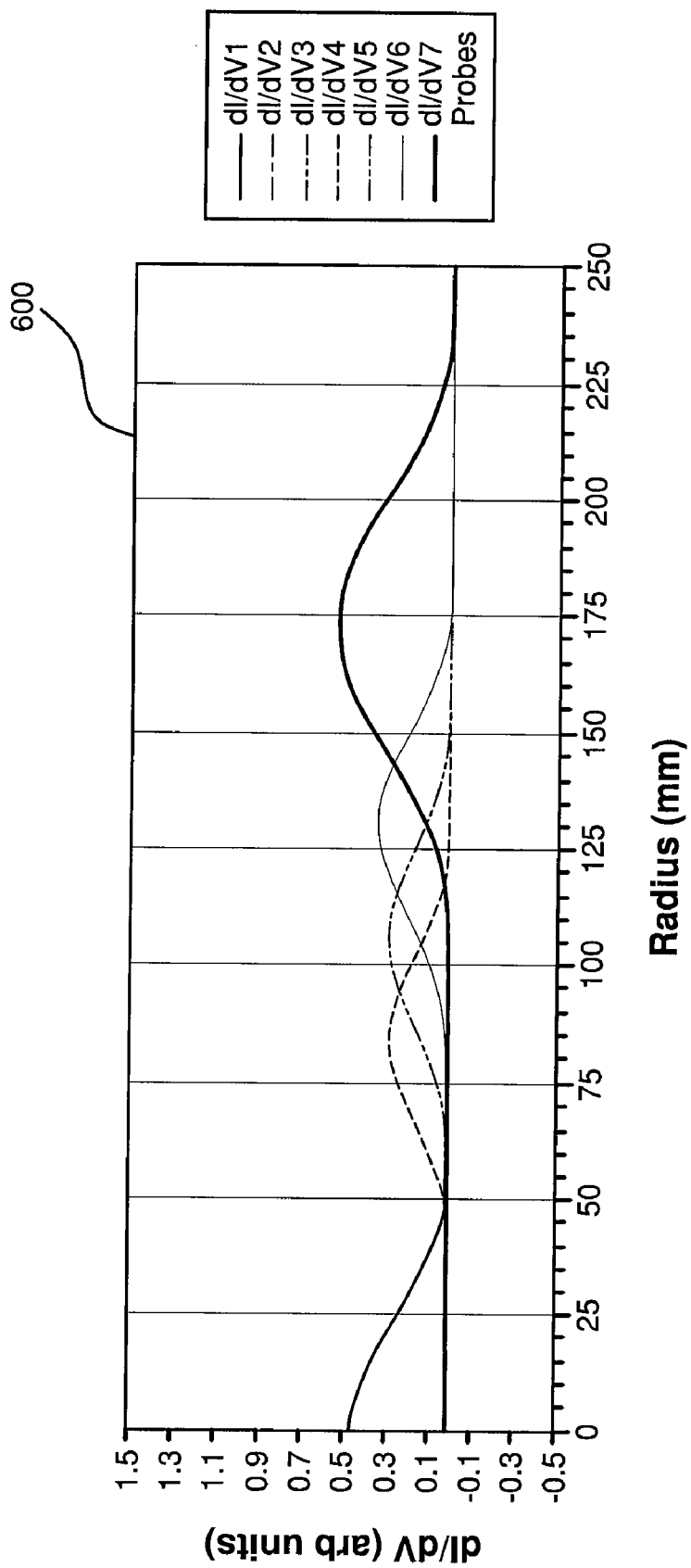
FIGS. 6A and 6B illustrate irradiation differentials as a function of location on a substrate and lamp voltage in accordance with an embodiment of the invention.

A relationship for dT/dI can be obtained experimentally. In one embodiment, it is assumed that dT/dI=2. In FIG. 6A graph 610 shows as an illustrative example a calculated radial differential temperature curve as result of irradiation differential $dI = dI(r)/dV * (−1, 1, 0, −1, 0, 0, 2)$ with dT/dI=2. Graph 610 in FIG. 6a shows the radial temperature distribution dT1 to dT7, the sum dT (curve 630) and contour relevant points 605 on curve 630 by using graph 600 as shown in FIG. 6A. Graph 600 in FIG. 6A shows dI/dV which is determined by using the graph of FIG. 5 which shows an illustrative example of the lamp irradiance in arbitrary units as a function of the radial position of the lamps. The radial differential temperature curve is applied to adjust a reference temperature curve. The metrology data taken from a monitor wafer may be adjusted, and in specific embodiments, this data is adjusted point by point with the calculated radial differential multiplied with the H matrix or with a look-up table. The H matrix converts temperature into metrology data, as was explained above.

Figure 6B:
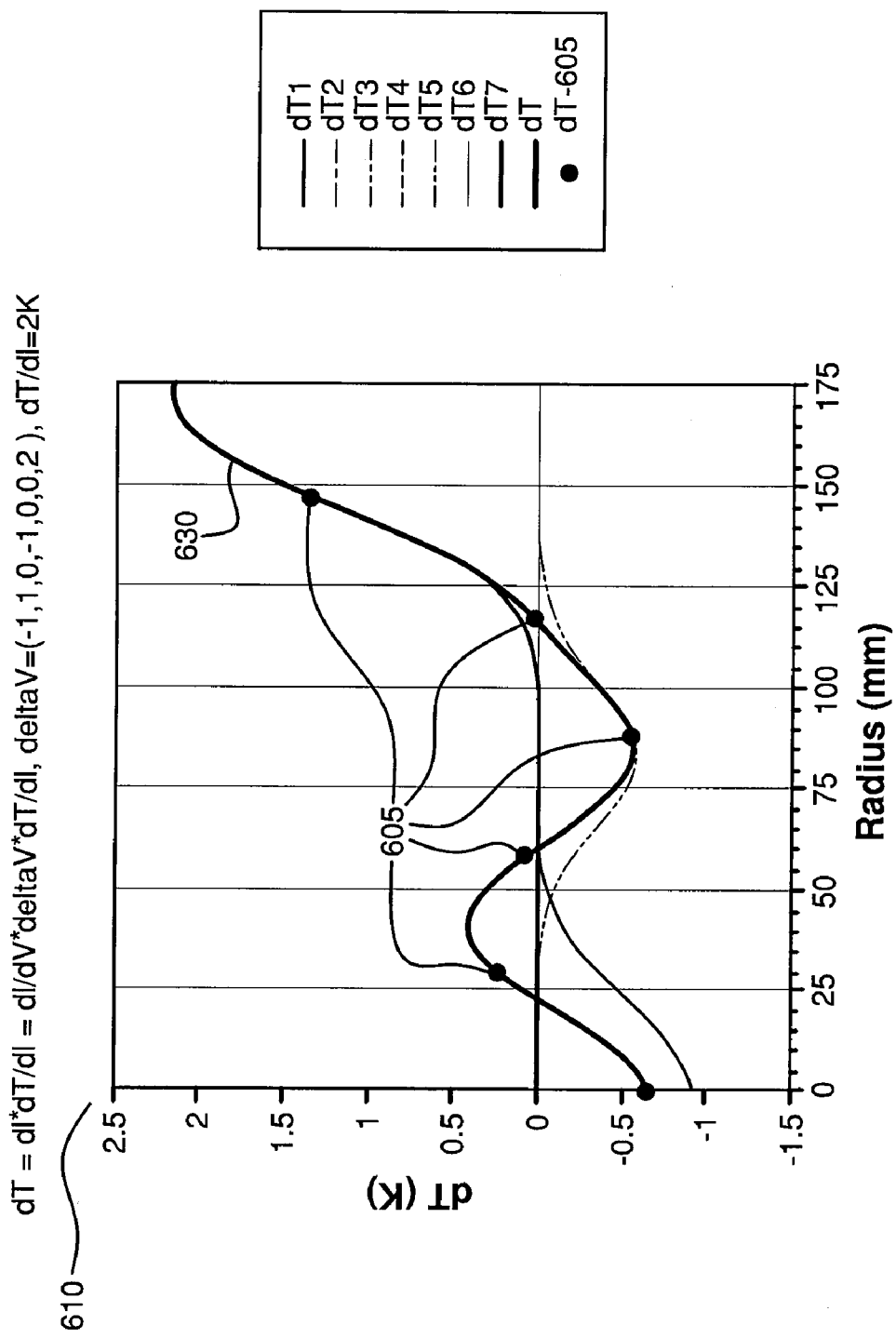
Figure 7A:
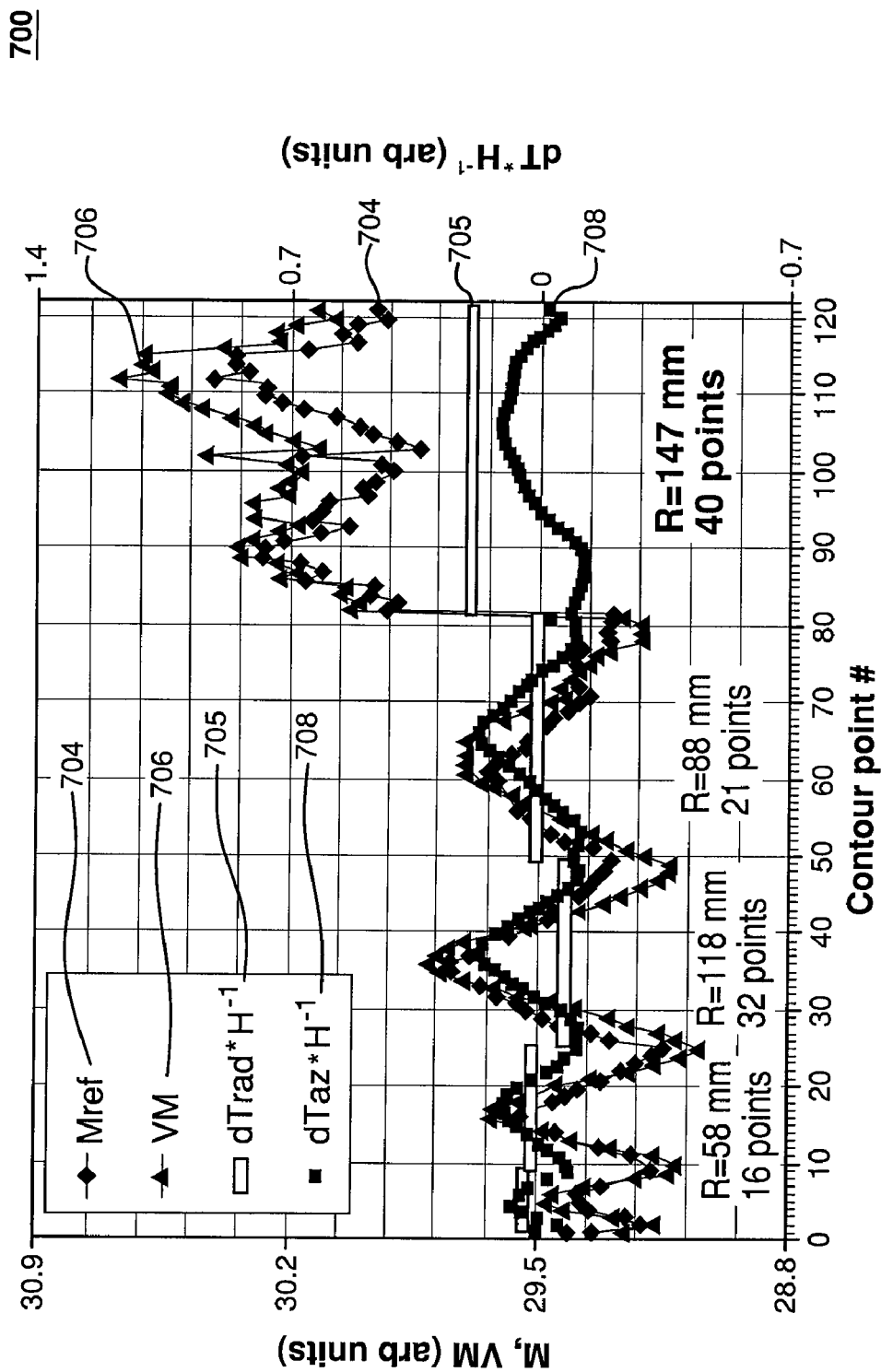
FIGS. 7A and 7B illustrate a temperature/metrology profile adjusted for a radial temperature/metrology profile in accordance with an embodiment of the present invention.
Figure 7B:
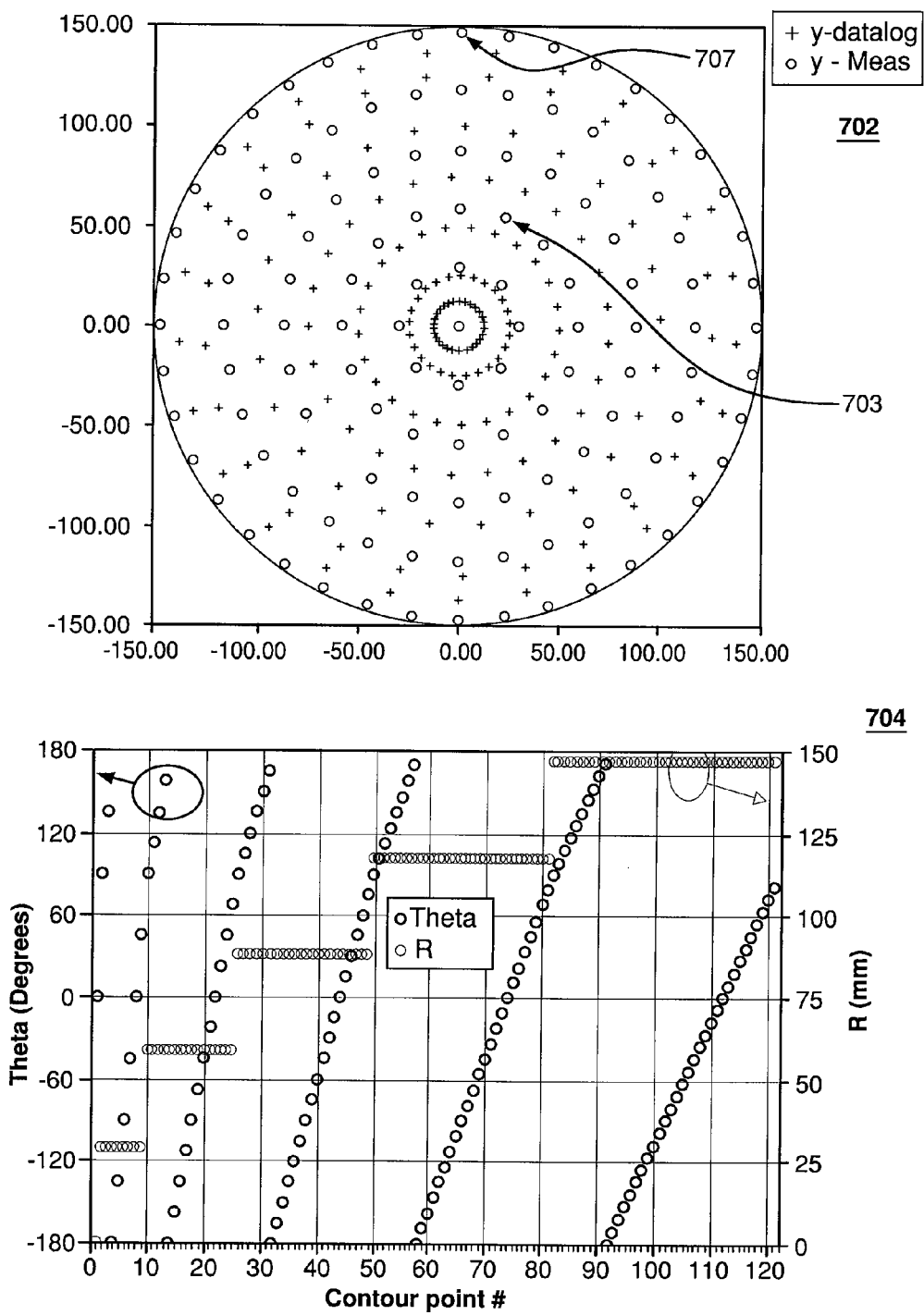

An example of a graph 700 showing radial and azimuthal differential temperature adjusted virtual metrology of the substrate is shown in FIG. 7A. The positions in the graph 700 are related to the temperature points on a wafer. A lay-out map with temperature/metrology points is provided as map 702 and 704 as shown in FIG. 7B. It can be seen in map 702 that 703 is part of a circle of 16 temperature/metrology points. The number of temperature/metrology points increases at the larger radii. The graph 704 shows that points on a circle may have different radii and different angles theta to determine their location. The curve 704 in graph 700 is a Metrology reference curve Mref(#cont) that needs to be adjusted for the radial temperature differential dTrad and the azimuthal temperature differential by performing the operation $VM(\#cont) = Mref + (dTrad + dTaz) * H^{−1}$ where $H^{−1}$ is the inverse of the matrix H from above, to provide the reverse transformation temperature to metrology data. Curve 705 in graph 700 is $dTrad * H^{−1}$, the radial temperature differential for the different sets of radial points of the map 702 which includes points 703 on an inner circle and 707 of the outer circle of map 702. Curve 705 in 700 relates to the calculated points 605 in FIG. 6B. Curve 706 provides the new and adjusted metrology curve, i.e. the virtual metrology curve VM, which is adjusted for radial and azimuthal differentials. As explained above, a temperature differential can be transformed into a metrology differential and vice versa. Accordingly, a curve 706 may represent a temperature curve; it may also represent a metrology curve, adjusted for temperature differentials. This depends, as was shown above, on the use of the matrix H or its reverse $H^{−1}$.

The aspects of determining an angular or azimuthal differential temperature map dTaz which is shown as curve 708 in graph 700 of FIG. 7A is explained extensively in the earlier cited U.S. Patent Publication No. US2008/0025368 A1, which is incorporated herein by reference. As was explained above, a substrate is rotating while being exposed by a spike of heat produced by heating elements such as lamps being located in different zones. The combination of all pyrometers (which are 7 pyrometers in the illustrative example) can provide time-based substrate mapping of temperatures. Coupling the rotational position of the substrate with a known x/y location of a probe provides an unambiguous location for a given temperature datum from the probe on the substrate. Measured and estimated temperature of a substrate over time windows obtained during performance of a recipe may be provided. For example, calculated values may be represented as a contour map over the substrate. The contour map may show information including but not limited to: (1) temperature uniformity; (2) peak temperature; (3) time above temperature; and/or (4) temperature gradient (rotational uniformity).

The probes/sensors, e.g., pyrometers 112A-G as shown in FIG. 1, measure each distinct point on the substrate only at the rotation rate, but the variation within a given radial distance is a slowly moving function in time and as such prior information may allow reasonable estimation of temperature at a later point in time. For example, a smoothing function that estimates the peak temperature as well as slope changes may be employed. Temperature data and rotational data are transformed to obtain average temperature trend, temperature uniformity and rotational uniformity information for each probe radius as a function of time.

In one embodiment the temperature data may be filtered to remove high-frequency components by performing a discrete Fourier Transform DFT on the data set. In a further embodiment, a Fast Fourier Transform (FFT) of an average temperature trend can be determined and higher frequency elements can be removed. In additional procedures, further information may be obtained. For example, temperature uniformity may be obtained by subtracting the trend data from the actual temperature data. In a subsequent example procedure, the temperature uniformity may be used to generate the relevant uniformity for each rotation of the substrate.

In an alternative embodiment a Fourier transform may be performed on the temperature uniformity data assuming an infinite repetition of three periods and an inverse Fourier transform may be performed to generate temperature uniformity data per rotation period. Alternatively, the Fourier transformation may be replaced by averaging data over, e.g., three rotation periods. In an additional alternative embodiment, temperature variation over time $t_c$ per period v for a probe may be obtained using an averaging algorithm. Methods and procedures for determining temperature uniformity are described in earlier cited U.S. Patent Publication No. US2008/0025368 A1.

The temperature data over time may be transformed into temperature data over time and location (contour). In one embodiment a uniformity contour may be defined for including a time where at $T_{ref}$ is maximum as shown in FIG. 3. In a further embodiment a uniformity contour is defined for at least one complete rotation of the substrate, the substrate experiencing during that rotation at least $T_{ref}$ is maximal. In a further embodiment a uniformity contour is determined including one or more rotations of the substrate and experiencing during that one or more rotations part and/or all of the heating spike caused by the heating source, being in the illustrative example the lamps in the lamp zones. Locations may be defined by the user, e.g., the locations need not coincide with the radial probe location, or with the angular location. The rate of repetition may be the same rate as the rotation. This means, for example, that out of 7 temperature data values for each rotation t along a particular angle Theta(t), temperature values may be generated by extrapolating from data proximate to a particular data point both spatially and/or temporally.

It is possible to collect all of the temperature data over one rotation, and to prepare a contour map based on the data locations. However, as data for higher-resolution contours typically requires more positions on the substrate, the data may be interpolated from neighboring data points. Interpolation may be performed to provide data based on the measured points around it. For example, according to one embodiment, interpolation may be performed by location on the x,y plane of the substrate by using neighboring data points to generate multiple gradients based on next and next-next neighbors. A final interpolation result may also use spatially averaged gradients as well as the values of closest neighbors to obtain a data-point. Known interpolation algorithms such as Delaunay triangulation may be employed to calculate these points as well as to obtain smoothed contour lines and to generate a color image.

According to further embodiments of the invention, a "time above temperature" may be determined. The time above temperature may be calculated from the data which is generated from the Fourier transformation instead of a moving average. In addition, a peak temperature may also be determined. The peak temperature may be determined from the data which is generated from the Fourier transformation instead of a moving average. Both parameters may be plotted on a contour map.

It is noted that in alternative embodiments of the invention, the example procedures described above may be performed in different orders and/or only a subset of the procedures may be performed. For example, in one or more embodiments, the generation of temperature uniformity or rotational uniformity data may not be performed and a temperature contour map may be generated directly.

The calculated values may be displayed in a manner replicating common displays of standard metrology tools. Numerous quantitative data may be displayed and/or stored.

Figure 8:
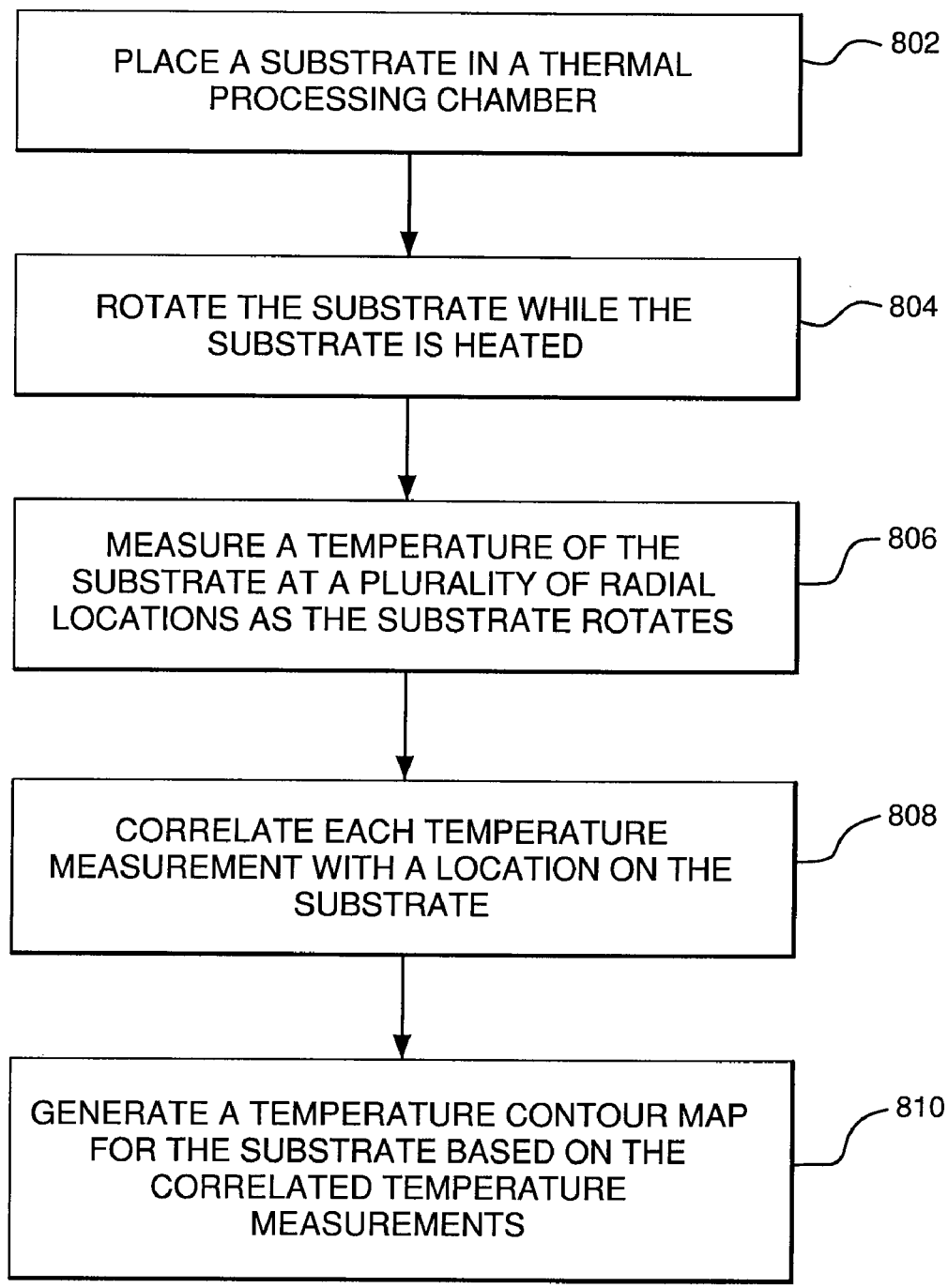
FIGS. 8 and 9 are flow diagrams of steps in accordance with one or more embodiments of the present invention.

Turning to FIG. 8, a flowchart depicting an example method 800 according to embodiments of determining an azimuthal contour map is provided. In step 802, a substrate is placed in a thermal processing chamber. In step 804, the substrate is rotated while the substrate is heated. In step 806, a temperature of the substrate at a plurality of radial locations is measured as the substrate rotates. In step 808, each temperature measurement is correlated with a location on the substrate. In step 810, a temperature contour map is generated for the substrate based on the correlated temperature measurements. In accordance with a further embodiment of the present invention, the above azimuthal differential temperature data may be transformed into metrology equivalent data by applying a look-up table or a matrix transformation.

In accordance with a further embodiment of the present invention, the azimuthal or angular differential temperature profile is applied to a reference temperature profile of the substrate which may already have been adjusted by a radial differential temperature. In general reference temperature adjustment by a radial and an azimuthal differential profile may be performed as radial adjustment first or with azimuthal adjustment first. As noted above, temperatures and temperature differentials can be replaced with equivalent metrology data. Accordingly, by performing the steps in accordance with an aspect of the present invention a virtual metrology data set or profile can be obtained, which may be presented as a contour, or as a differential contour which may reflect directly the uniformity of the process performed by the chamber in relation to an earlier snap-shot of the process.

Figure 9:
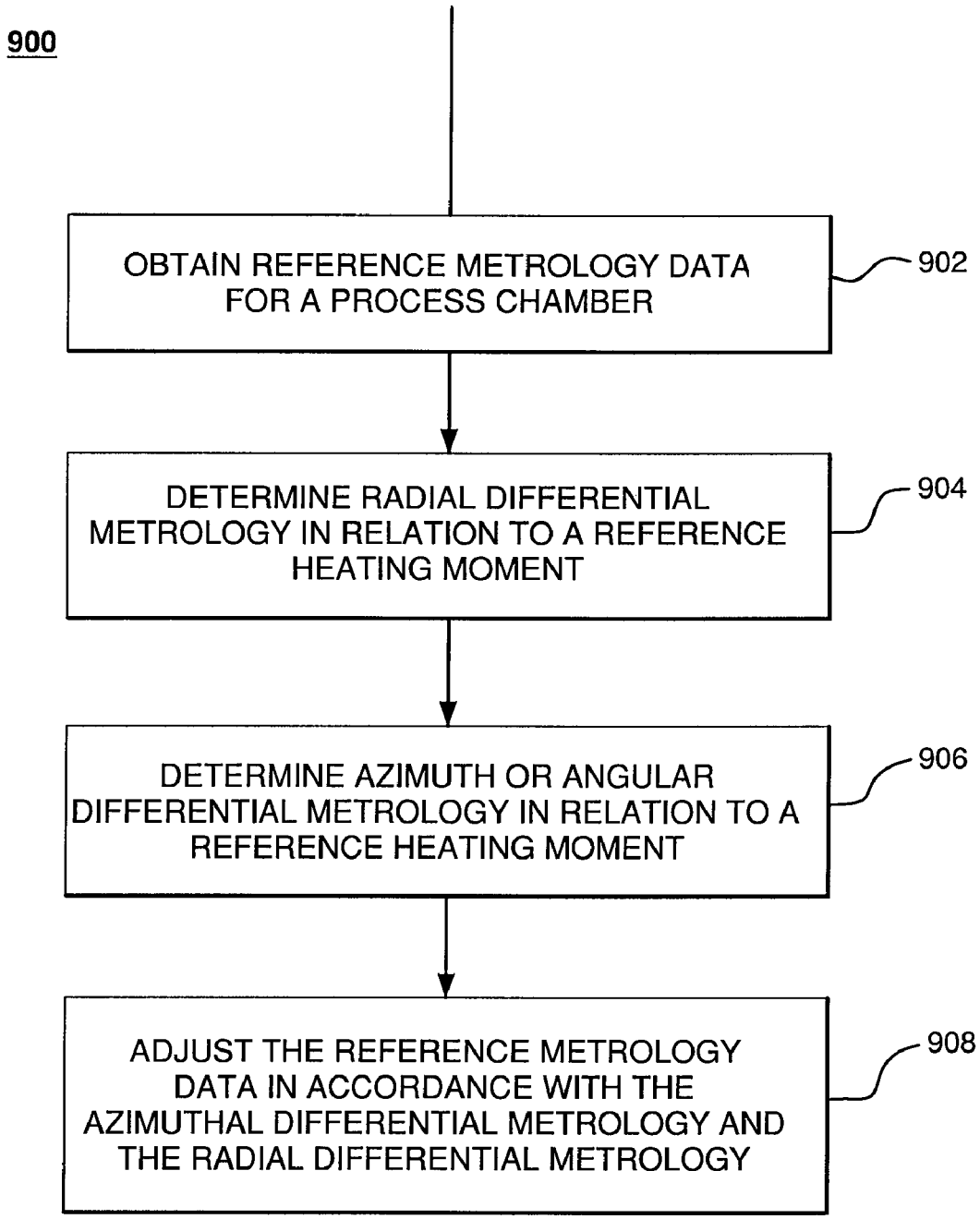

Now referring to FIG. 9, this figure is a flow diagram 900 of the steps of a method in accordance with an aspect of the present invention. In step 902 a reference metrology data set is determined of a processing chamber having a set of process parameters. In step 904 the radial differential metrology data of a substrate is determined, for instance after the process chamber having processed a number of substrates. In step 906 the azimuthal differential metrology data of the chamber and the substrate is determined. In step 908 the reference metrology data is adjusted in accordance with the radial and the azimuthal differential metrology. A step 903 can be included to determine a further set of reference data, wherein the reference substrate is a patterned production or prototype substrate. This may be useful for using temperatures as surrogate for metrology data. In that case the substrate of step 902 may be a monitor wafer. Reference data from a prototype wafer, determined with substantially the same process parameter settings as for the monitor wafer, may make comparison of temperature differentials as a surrogate for metrology differentials easier.

Figure 10:
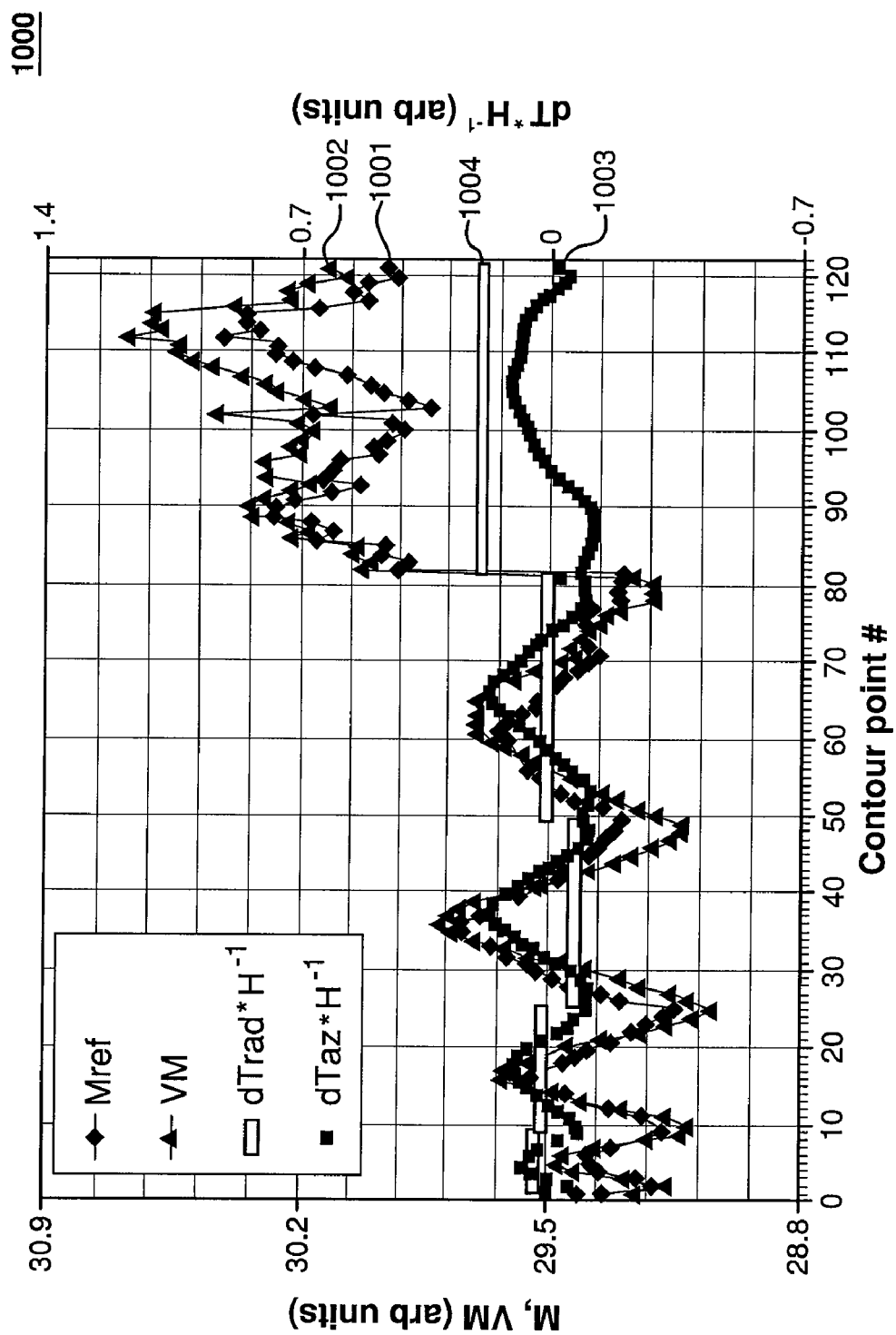
FIG. 10 is a graphical representation of contour data plotting the temperature/metrology profile of FIG. 7 adjusted for an azimuthal profile in accordance with an embodiment of the present invention.

FIG. 10 shows a graph 1000 wherein curve 1001 is the reference metrology data as a function of the wafer contour point number (such as points 703 and 707 as marked in map 702. Curve 1004 is the radial temperature/metrology differential as was provided as curve 705 in FIG. 7A. Curve 1003 provides the azimuthal or angular temperature/metrology differentials, which was provided as curve 708 in FIG. 7A. The temperature/metrology points are related to map 702 of FIG. 7b. It can be seen that the azimuthal temperature/metrology differential as determined in accordance with an aspect of the present invention may change for points that are on the same radial of the substrate. As a step in accordance with a further embodiment of the present invention a reference temperature/metrology profile or curve is adjusted with both the radial and azimuthal differential profiles or curves. In one embodiment, the already radial temperature/metrology adjusted profile/curve is adjusted with an azimuthal differential profile/curve. Curve 1002 of FIG. 10 shows such an adjusted curve, which may be called the virtual metrology (VM) curve. An adjusted profile in the form of a table, or in a contour or in any other form that would be useful in establishing a virtual metrology can also be provided.

According to embodiments of the present invention, temperature distribution across a substrate may be derived from existing temperature and substrate position data and may be combined with heating lamp control data and used to provide "virtual" metrology for a substrate (e.g., eliminating, reducing or supplementing conventional metrology analysis). Numerous additional applications may be created.

The description above can be implemented as a system. An exemplary system comprises at least a processor and a memory. Exemplary systems also contain sensors. Such systems are able to generate control signals, for example, to control one or more heating sources such as heating lamps. The memory is able to store data and instructions. The processor is able to read instructions from the memory and to execute the instructions. The processor is also able to read data from memory and to write data to the memory. The processor is also able to process signals generated by the sensors, either directly or through a memory. The processor is also able to generate the control signals for the heating sources, by calculating the required value of the control signals and generating them or by providing instructions and/or data to a temperature control unit which is part of the system that can generate the appropriate lamp or heat source signals. The system can determine from sensor data the differential profiles that are described above and calculate the Virtual metrology profiles. The system may also be provided with the instructions and capabilities to calculate new parameter settings for the processing chamber after determining the virtual metrology profile. The system may also be able to provide an alert or to interrupt processing chamber operations after a virtual metrology profile was determined. In accordance with a further aspect of the present invention the system may be connected and able to interact with a supervisory system or a supervisory process control system. As an example, the controller 116 of FIG. 1 will include a processor, processing circuitry and memory.

Reference throughout this specification to "one embodiment," "certain embodiments," "one or more embodiments" or "an embodiment" means that a particular feature, structure, material, or characteristic described in connection with the embodiment is included in at least one embodiment of the invention. Thus, the appearances of the phrases such as "in one or more embodiments," "in certain embodiments," "in one embodiment" or "in an embodiment" in various places throughout this specification are not necessarily referring to the same embodiment of the invention. Furthermore, the particular features, structures, materials, or characteristics may be combined in any suitable manner in one or more embodiments. The order of description of the above method should not be considered limiting, and methods may use the described operations out of order or with omissions or additions.

It is to be understood that the above description is intended to be illustrative, and not restrictive. Many other embodiments will be apparent to those of ordinary skill in the art upon reviewing the above description. The scope of the invention should, therefore, be determined with reference to the appended claims, along with the full scope of equivalents to which such claims are entitled.

The invention claimed is:

1. A method of determining a virtual metrology profile of a substrate being processed in a process chamber, the process chamber having a plurality of heat sources being controlled by a plurality of control signals being generated by a control system, the processing chamber having a plurality of pyrometers, comprising:
processing a reference substrate and determining a reference metrology profile;
determining a first differential profile of the substrate based on a first set of the plurality of control signals and based on a second set of the plurality of control signals;
determining a second differential profile of the substrate by processing a first and a second plurality of signals generated by the plurality of pyrometers; and
determining the virtual metrology profile by adjusting the reference metrology profile in accordance with the first and the second differential profile.

2. The method as claimed in claim 1, further comprising: rotating the substrate while the substrate is heated.

3. The method as claimed in claim 1, wherein the first differential profile represents a radial temperature differential of the substrate.

4. The method as claimed in claim 1, wherein the control signal is a lamp control voltage.

5. The method as claimed in claim 1, wherein the second differential profile represents an azimuthal temperature differential of the substrate.

6. The method as claimed in claim 1, wherein the virtual metrology profile relates to a thickness of a layer.

7. The method as claimed in claim 1, wherein the virtual metrology profile relates to a sheet resistance.

8. The method as claimed in claim 1, wherein the virtual metrology profile relates to a transistor property.

9. The method as claimed in claim 1, further comprising: determining if the virtual metrology profile is substantially different from the reference metrology profile.

10. The method as claimed in claim 9, further comprising: modifying an operational parameter setting of the process chamber.

11. The method as claimed in claim 9, further comprising: interrupting operation of the process chamber.

12. The method as claimed in claim 1, wherein the reference substrate is a monitor wafer.

13. A system for creating a virtual metrology profile for a process chamber, the process chamber having a plurality of heat sources being controlled by a plurality of control signals being generated by a control system, the processing chamber having a plurality of temperature sensors, comprising:
a computer memory; and
a processor enabled to read instructions and data from the computer memory, to write data to the computer memory and enabled to execute the instructions to perform the steps of:
processing a reference substrate and determining a reference metrology profile;
determining a first differential profile of the substrate based on a first set of the plurality of control signals and based on a second set of the plurality of control signals;
determining a second differential profile of the substrate by processing a first and a second plurality of signals generated by the plurality of temperature sensors; and
determining the virtual metrology profile by adjusting the reference metrology profile in accordance with the first and the second differential profile.

14. The system as claimed in claim 13, wherein the first differential profile represents a radial temperature differential of the substrate.

15. The system as claimed in claim 13, wherein the control signal is a lamp control voltage.

16. The system as claimed in claim 13, wherein the second differential profile represents an azimuthal temperature differential of the substrate.

17. The system as claimed in claim 13, wherein the virtual metrology profile relates to a thickness of a layer.

18. The system as claimed in claim 13, wherein the virtual metrology profile relates to a transistor property.

19. The system as claimed in claim 13, further comprising:
   determining if the virtual metrology profile is substantially different from the reference metrology profile.

20. A method for generating a virtual metrology (VM) profile determined from a substrate temperature comprising:
   determining a differential azimuthal temperature distribution of the substrate relative to a reference run;
   determining a differential radial temperature distribution of the substrate relative to the reference run; and
   determining a VM result by processing a measured temperature distribution from the reference run, the differential radial temperature distribution, and the differential azimuthal temperature distribution.

* * * * *